United States Patent [19]
Goto et al.

[11] Patent Number: 4,982,071
[45] Date of Patent: Jan. 1, 1991

[54] INFORMATION RECORDING CARD AND CHARGE MAKING/PAYING SYSTEM EMPLOYING THE SAME

[75] Inventors: Kanzen Goto, Aichi; Mitsuo Chiba, Seto; Tateo Yokoyama, Nagoya, all of Japan

[73] Assignee: Hitachi, Ltd., Tokyo, Japan

[21] Appl. No.: 236,744

[22] Filed: Aug. 26, 1988

[30] Foreign Application Priority Data

Aug. 26, 1987 [JP] Japan ................................ 62-210053

[51] Int. Cl.$^5$ .............................................. G06K 5/00
[52] U.S. Cl. ..................................... 235/380; 235/449
[58] Field of Search ................................ 235/449, 380

[56] References Cited

U.S. PATENT DOCUMENTS 3,803,388  4/1974  Williamson ..................... 235/449
4,843,220  6/1989  Haun .............................. 235/380

FOREIGN PATENT DOCUMENTS 57-29191  6/1982  Japan .
60-175192  2/1985  Japan .

*Primary Examiner*—Harold I. Pitts
*Attorney, Agent, or Firm*—Fay, Sharpe, Beall, Fagan, Minnich & McKee

[57] ABSTRACT

The information recording card of the present invention comprises a postcard or a blank form equal in size thereto, and a magnetic stripe which is stuck on one surface of the postcard or the blank form so as to extend along the shorter or longer latus thereof and in which the payment data of a specified charge is written. Such a magnetic stripe-stuck card is efficiently utilized for a specified charge making/paying system. In the charge making/paying system, the payment data of the specified charge is stored in the memory unit of a host computer which is installed in, e.g., the center of a public office, and the card whose magnetic stripe has the charge payment data written therein by a magnetic tape writer is mailed to a customer. In case of the payment of the charge, a charge transfer machine reads the charge payment data written in the magnetic stripe and displays the specified payment data to the customer again, and when the customer had paid the charge in accordance with the display, the recording of the charge payment data in the magnetic stripe is renewed into "paid" data.

2 Claims, 3 Drawing Sheets

FIG. 1(a) FIG. 1(b)
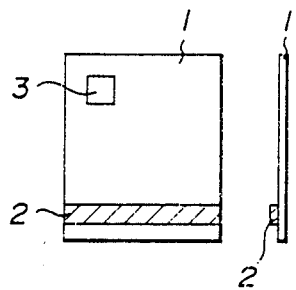
FIG. 2(a) FIG. 2(b)
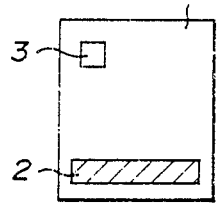 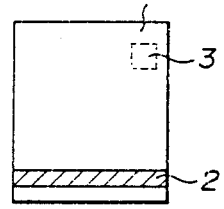
FIG. 2(c) FIG. 2(d) FIG. 2(e)
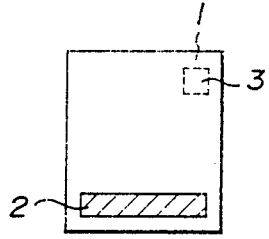 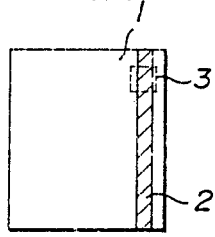 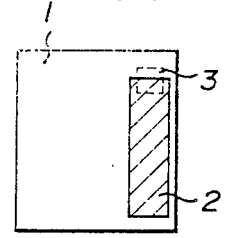

INFORMATION RECORDING CARD AND CHARGE MAKING/PAYING SYSTEM EMPLOYING THE SAME

BACKGROUND OF THE INVENTION (a) Field of the Invention

The present invention relates to an information recording card, and a charge making/paying system employing the same. More particularly, it relates to a card in which a magnetic stripe bearing specified information is secured to a predetermined place on a postcard or a blank form equal in size thereto, and a charging/paying system which employs the card.

(b) Statement of Related Art

As so-called magnetic cards in each of which a magnetic memory area is provided on a card of plastics or paper, there are banking cards, various credit cards, telephone cards, etc., and there have been proposed, e.g., a disposable magnetic-card coupon disclosed in the official gazette of Japanese Patent Application Laid-open No. 175192/1985, and an information recording card and a commutation ticket disclosed in the official gazettes of Japanese Patent Application Laid-open Nos. 29191/1982 and 29192/1982. However, it has not been proposed yet to utilize such a magnetic card for a charge making/paying system. When a public office, a bank, a stock company or any other entity (hereinbelow, termed "payee") makes a specified charge to a customer and receives the charge, it is sometimes the case that the payee sends the customer a postcard on which various items of data on payment information, such as the class of the charge, the charged amount of money, the due date, and a user code, are printed. The customer pays through the automatic transfer by which the charged amount of money is automatically transferred from a bank account designated by the customer beforehand, to the payee's bank account, or he/she pays to the payee through a predetermined bank or directly. Especially in a case where, in paying public utilities charges such as gas charges, electric charges, telephone charges, water charges and drainage charges or paying taxes such as the fixed property tax, the customer pays to companies and public officies including a taxation office, which are payees, through predetermined banks or directly. It is the present situation that involves processes to be executed at the windows of the companies etc. that include the troublesome operations of re-inputting data such as the classes of the charges, the paid amounts of money and the user code.

SUMMARY OF THE INVENTION

An object of the present invention is to provide an information recording card and a charge making/paying system employing it, which can eliminate the problem of the conventional charge making/paying system as explained above.

Another object of the present invention is to provide a magnetic stripe-stuck card which is well suited especially to the billing/paying of public utilities charges, and in which a magnetic stripe bearing, at least, data on payment information is stuck to a predetermined place on a postcard or a blank form equal in size thereto.

Still another object of the present invention is to provide a charging/paying system for various charges, which utilizes such a magnetic stripe-stuck card and which makes it unnecessary that a staff member at the window inputs data on the payment information again as in the conventional system.

With the charge making/paying system of the present invention, a position for sticking a magnetic stripe is previously set at a certain place common to the class of charges, thereby making it unnecessary to install writers/readers for writing/reading data into and from the magnetic stripes of the individual classes of public utilities charges, and making it possible to install a magnetic tape writer/reader common to the classes of the charges. Therefore, the billing/paying of different classes of charges can be coped with.

Further advantages and objects of the present invention will become apparent from the following detailed description and the accompanying drawings.

BRIEF DESCRIPTION OF THE DRAWINGS

FIGS. 1(a) and 1(b) are schematic front and side views showing an embodiment of an information recording card according to the present invention, respectively;

FIGS. 2(a) thru 2(e) are schematic front or rear views showing other embodiments of different positions for sticking magnetic stripes;

PREFERRED EMBODIMENTS OF THE INVENTION

Figure 3:
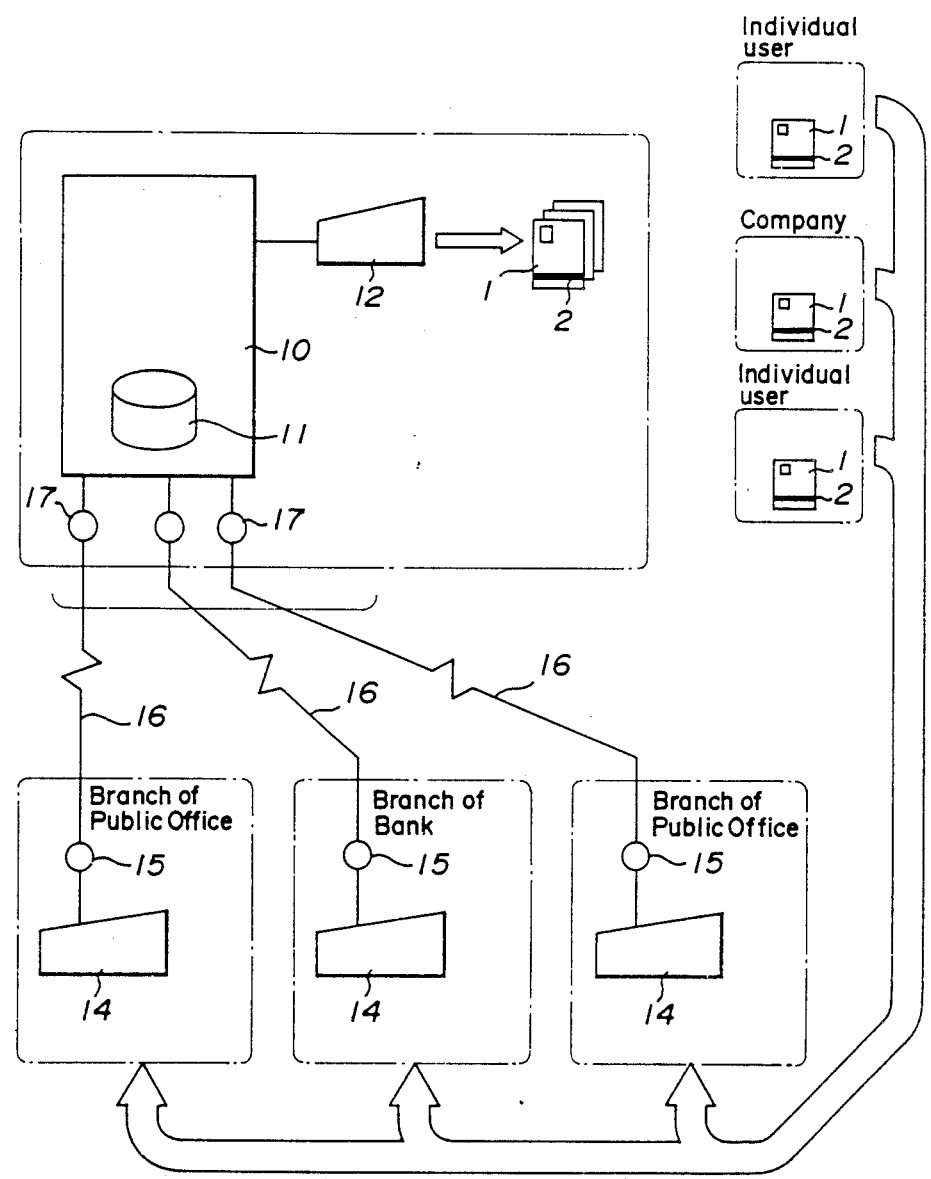
FIG. 3 is a diagram showing the schematic construction of a charge making/paying system which employs the information recording card of the present invention.
Figure 4:
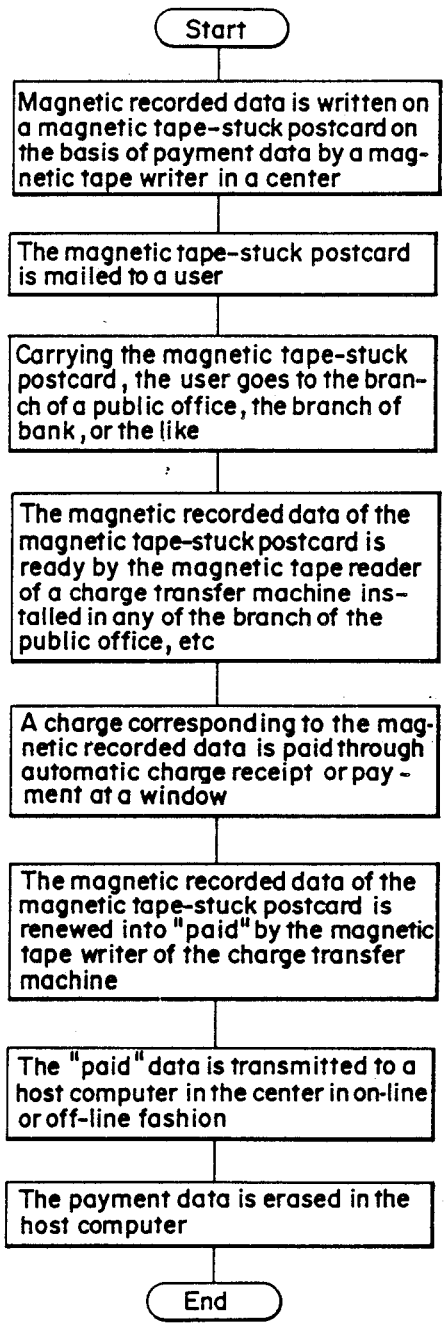
FIG. 4 is a flow chart for explaining the operation of the charge making/paying system in FIG. 3.

Now, embodiments of the information recording card of the present invention will be described in detail with reference to the accompanying drawings. Shown in FIGS. 1(a) and 1(b) is an information recording card which is formed of a postcard 1, and a magnetic stripe 2 stuck on the front surface thereof. Alternatively, the magnetic stripe 2 can be stuck to a blank form which is equal in size to the postcard 1. Numeral 3 indicates a part on which a postage stamp is to be affixed The magnetic stripe 2 is stuck to the lower part of the front surface of the postcard 1 so as to extend along the shorter latus of the postcard and to connect the two opposing longer latera thereof. That is, the length of the magnetic stripe 2 is made equal to the width of the postcard 1. The magnetic stripe 2 bears data items on payment information, such as the class of a charge made to a customer, the due date, the amount of money to be paid, the rates of arrears, and customer code no. Alternatively, as illustrated in FIG. 2(a), the magnetic stripe 2 can be formed somewhat shorter than the width of the postcard 1 and stuck to the lower part of the front surface of the postcard 1 so as to extend along the shorter latus of the postcard In addition, as illustrated in FIG. 2(b), the magnetic stripe 2 can be formed as having a length equal to the width of the postcard 1 and stuck to the lower part of the rear surface of the postcard 1 so as to extend along the shorter latus of the postcard 1 and to connect the two opposing longer latera thereof. Further, as illustrated in FIG. 2(c), the magnetic stripe 2 can be formed somewhat shorter than the width of the postcard 1 and stuck to the lower part of the rear surface of the postcard 1 so as to extend along the shorter latus thereof. Further, as illustrated in FIG. 2(d), the magnetic stripe 2 can be formed as having a length equal to the height of the postcard 1 and stuck to the rear surface of the postcard 1 so as to extend along one side latus thereof, namely, to extend in the lengthwise direction thereof. Besides, as illustrated in FIG. 2(e), the magnetic stripe 2 can be formed somewhat shorter than the height of the postcard 1 and stuck so as to extend in the longitudinal direction of the postcard. The length of the magnetic stripe 2 ought to be selected equal to or somewhat smaller than the width or height of the postcard 1, while the width of the magnetic stripe 2 is properly selected. In a case where a public office or any one of various companies utilizes the postcard 1 provided with such a magnetic stripe 2 in, for example, a charge making/paying system for customers, positions for sticking the magnetic stripes 2 are unified and set beforehand. Then, a writer/reader can be shared for various charges Next, an embodiment of a charge making/paying system which employs the information recording card as explained above will be described with reference to FIGS. 3 and 4. This embodiment concerns a billing/paying system for water and drainage charges. Numeral 10 indicates a host computer which is installed in the computer center of a public office. The host computer 10 includes a central processing unit, and a memory unit 11 which stores therein data on the classes of public utilities charges, the amounts of money to be paid, the due dates, the rates of arrears, the user codes, etc. of respective users Data items on the water and sewer charges of each user are written into the magnetic stripe 2 of a postcard 1 by a magnetic tape writer 12 for every user, while a name and an address are printed out on the front surface of the postcard 1 for every user. Further, the aforementioned data items are printed out in the part of the postcard 1 except the part thereof where the magnetic stripe 2 is stuck. Such postcards 1 are mailed to the respective users. Each user goes to a public office or the branch thereof or to a bank while carrying the amount of money based on the data printed out on the postcard 1 received The data items printed out on the postcard 1 contain the amount of money to be paid, the due date and the rates of arrears, so that when the term of payment has expired, each user can calculate the arrears on the basis of the due date and the rate of arrears and add the arrears to the amount of payment. Each user sets the postcard 1 with the magnetic stripe 2 stuck thereto, in a charge transfer machine 14 which is installed in the public office or the branch thereof or in the bank. The charge transfer machine 14 includes a magnetic tape reader/writer, a display, a printer, a computer, etc. Thus, the data items in the magnetic stripe 2 are read by the magnetic tape reader and are indicated on the display. After acknowledging the displayed data, the user transfers the corresponding charges In the case where the day on which the user sets the postcard 1 with the magnetic stripe 2 stuck thereto is later than the due date, the computer calculates the arrears from the day of the payment, the due date and the rate of arrears and indicates the calculated amount on the display. In this manner, the magnetic information in the magnetic stripe 2 is automatically read and indicated on the display. It is therefore dispensed with that, with reference to a postcard which each user must carry to the public office or the branch thereof in the conventional manner and on which a detailed account or the amount of payment issued to each user by the public office is printed out, the staff member at the window of the public office inputs the data again and accesses the host computer 10 installed in the computer center of the public office. When the amount of money paid by the user and the amount of money indicated on the display have agreed, the data in the magnetic stripe 2 is renewed into "paid" data by the magnetic tape writer, and on the part of the postcard 1 other than the place thereof where the magnetic stripe 2 is stuck, it is indicated by the printer that the charges have been paid. Thus, it becomes possible to prevent the double payment of the charges. Here, the system is so constructed that the "paid" data recorded and renewed by the magnetic tape writer is thereafter transmitted to the host computer 10 through a model 15, a dedicated circuit or public circuit 16, and a modem 17, and that the corresponding payment data stored in the memory unit 11 is erased in the host computer 10. By employing the postcard with the stuck magnetic stripe 2 as the information recording card for the charge making/paying system, accordingly, the processing operations which the staff member at the window has heretofore performed can be reliably and promptly executed in the public office being a payee, and the quantities of operations of the staff member at the window can be sharply reduced.

Although the charge making/paying system described above has been applied to the water and sewer charges, it is a matter of course that the invention is also applicable to the billing/paying of gas charges, electric charges, telephone charges and other various charges When positions for sticking magnetic stripes 2 are stipulated at fixed places beforehand for all such classes of charges, economically the billing/paying of the classes of charges can be processed using a common magnetic tape reader/writer, namely, a common charge transfer machine.

What is claimed is:

1. In a charge making/paying system which employs an information recording card for postal use, and a magnetic stripe writing data thereon and for reading data therefrom secured to a predetermined place on one surface of the card so as to extend along one of a shorter latus and longer latus thereof; a charge making/paying system comprising a host computer which includes a memory unit for storing data on payment information of customers, a first writer which serves to write the data onto the magnetic stripe, a reader which serves to read the data written on the magnetic stripe of said information recording card, a second writer by which the data written on the magnetic stripe is renewed into "paid" data when an amount of money corresponding to the data read by said reader has been received, and means for transmitting the "paid" data to said host computer when said second writer has renewed the written data.

2. A charge making/paying system as defined in claim 1, further comprising printing means for printing out the "paid" data on said information recording card when the written data is renewed by said second writer.

* * * * *